United States Patent
Nilsson et al.

(10) Patent No.: US 11,765,459 B2
(45) Date of Patent: Sep. 19, 2023

(54) IMAGE STABILIZATION OF A VIDEO STREAM CAPTURED BY A PANABLE AND/OR TILTABLE VIDEO CAMERA

(71) Applicant: Axis AB, Lund (SE)

(72) Inventors: Tor Nilsson, Lund (SE); Johan Förberg, Lund (SE); Toivo Henningsson, Lund (SE); Johan Nyström, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/531,995

(22) Filed: Nov. 22, 2021

(65) Prior Publication Data
US 2022/0182547 A1 Jun. 9, 2022

(30) Foreign Application Priority Data
Dec. 7, 2020 (EP) .................................... 20212227

(51) Int. Cl.
H04N 5/232 (2006.01)
H04N 23/68 (2023.01)

(52) U.S. Cl.
CPC ....... *H04N 23/683* (2023.01); *H04N 23/6811* (2023.01); *H04N 23/6812* (2023.01)

(58) Field of Classification Search
CPC ........... H04N 5/23254; H04N 5/23258; H04N 5/23267; H04N 5/23299
See application file for complete search history.

(56) References Cited

U.S. PATENT DOCUMENTS 6,965,397 B1   11/2005  Honey et al.
10,728,454 B2 *  7/2020  Idaka .................... H04N 23/62
(Continued)

FOREIGN PATENT DOCUMENTS

| CA | 2631299 A1 | 11/2009 |
| CN | 110556030 A | 12/2019 |
| EP | 3288177 A1 * | 2/2018 |
| KR | 100735959 B1 | 7/2007 |

OTHER PUBLICATIONS

V. P. Venkata and N. V, Control system design for tricopter using filters and pid controller, 2016, [online] Available: https://arxiv.org/abs/1604.01162. two pages (Year: 2016).*

(Continued)

*Primary Examiner* — Michael J Hess
*Assistant Examiner* — Naod W Belai
(74) *Attorney, Agent, or Firm* — Volpe Koenig

(57) ABSTRACT

A method for image stabilization of a video stream captured by a panable and/or tiltable video camera the method comprising: generating a motor position signal, Y1, of a pan/tilt motor of the video camera; generating a gyro signal, Y2, of a gyroscopic sensor of the video camera; generating a reference signal from a predetermined movement curve of the pan/tilt motor of the video camera, the reference signal is a reference on how a pan/tilt operation of the video camera is made without shaking of the video camera; from the motor position signal, Y1, and the gyro signal, Y2, generating a combined signal, Y, according to: Y=F1*Y1+F2*Y2, wherein F1 is a low pass filter and F2 is a high pass filter; and performing image stabilization on the video stream based on a difference between the combined signal, Y, and the reference signal.

8 Claims, 2 Drawing Sheets

(56) References Cited

U.S. PATENT DOCUMENTS

| | | | | |
|---|---|---|---|---|
| 2009/0160954 A1* | 6/2009 | Yamada | ................. | G03B 5/00 |
| | | | | 348/208.6 |
| 2010/0265341 A1* | 10/2010 | Hirayama | .............. | H04N 23/68 |
| | | | | 348/208.1 |
| 2016/0286130 A1* | 9/2016 | Ryu | ................. | H04N 23/6812 |
| 2017/0085740 A1 | 3/2017 | Lin et al. | | |
| 2020/0120282 A1* | 4/2020 | Guo | ................. | H04N 23/6812 |
| 2020/0412954 A1* | 12/2020 | Gaizman | ........... | H04N 23/6811 |

OTHER PUBLICATIONS

Extended European Search Report dated May 12, 2021 for European Patent Application No. 20212227.1.
Candido et al., "Shared control of a pan-tilt camera on an all-terrain mobile robot," 2008 IEEE International Conference on Emerging Technologies and Factory Automation, pp. 177-183 (2008).
Higgins, "A Comparison of Complementary and Kalman Filtering," in IEEE Transactions on Aerospace and Electronic Systems, vol. AES-11, No. 3, pp. 321-325 (May 1975).
Gerbracht et al., "Motion Control: Accuracy and precision rule pan-tilt positioners in critical camera applications," Laser Focus World, Available at: https://www.laserfocusworld.com/software-accessories/positioning-support-accessories/article/16548257/motion-control-accuracy-and-precision-rule-pantilt-positioners-in-critical-camera-applications (Apr. 11, 2017).
Nyberg et al., "Camera stabilization" (Dissertation) (2017).

* cited by examiner

IMAGE STABILIZATION OF A VIDEO STREAM CAPTURED BY A PANABLE AND/OR TILTABLE VIDEO CAMERA

FIELD OF INVENTION

The present invention relates to image stabilization of a video stream, especially of a video stream captured by a video camera during pan/tilt of the same.

TECHNICAL BACKGROUND

During capturing of a video stream, a camera capturing the video stream can be shaken, e.g., due to wind, passing traffic, etc. As a result, images of the video stream are often blurry and troublesome to view. Image stabilization, especially, Electronic Image Stabilization, EIS, effectively minimizes the effects from vibration and shaking to give clear and precise image frames of the video stream. During EIS one or more gyroscopic sensors of the camera continuously detect the camera's movement and vibration. Based on the output from the one or more gyroscopic sensors the image frames of the video stream may be adjusted to ensure a stable video stream.

However, during pan/tilt movement of a pan/tilt video camera EIS is typically switched off, Hence, there is a need for enabling image stabilization of a video stream captured using a pan/tilt video camera that is panning and/or tilting during the capturing of the video stream.

SUMMARY

In view of the above, providing image stabilization of a video stream captured by a pan/tilt video camera that is panning and/or tilting during the capturing of the video stream would be beneficial.

Additionally, alleviating or eliminating one or more of the above-identified deficiencies in the art and disadvantages singly or in any combination and solve at least the above-mentioned problem would also be beneficial.

According to a first aspect, a method for image stabilization of a video stream captured by a panable and/or tiltable video camera is provided. The method comprises: generating a motor position signal, $Y_1$, of a pan/tilt motor of the video camera; generating a gyro signal, $Y_2$, of a gyroscopic sensor of the video camera; generating a reference signal from a predetermined movement curve of the pan/tilt motor of the video camera, the reference signal is a reference on how a pan/tilt operation of the video camera is made without shaking of the video camera; from the motor position signal, $Y_1$, and the gyro signal, $Y_2$, generating a combined signal, Y, according to: $Y=F_1*Y_1+F_2*Y_2$, wherein $F_1$ is a low pass filter and $F_2$ is a high pass filter; and performing image stabilization on the video stream based on a difference between the combined signal, Y, and the reference signal.

The present concepts provide possibilities for improvement of image stabilization of image frames of a video stream captured during panning and/or tilting of a video camera. This since low pass filter filtering the motor position signal and high-pass filter filtering the gyro signal a less noise combined signal indicative of the shaking of the video camera during panning and/or tilting may be archived. Further, the reference signal may be used to indicate the pan and/or tilt movement of the video camera. The present method allows for image stabilization induced both by shaking of the video camera and recoil effects induced by the motor.

For example, a single-pole infinite impulse response, IIR, filter may be used. Such a filter may be used to implement both low-pass and high-pass filtering.

The high pass filter may be complementary to the low pass filter such that, $F_2=1-F_1$.

According to a second aspect, a non-transitory computer-readable storage medium is provided. The non-transitory computer-readable storage medium has stored thereon instructions for implementing the method according to the first aspect, when executed on a device having processing capabilities.

According to a third aspect, a video camera is provided. The video camera comprises: an image sensor configured to capture image frames of a video stream; a pan/tilt motor configured to pan and/or tilt the video camera; a gyroscopic sensor configured to detect shaking of the video camera; and control circuitry. The control circuitry is configured to execute: a motor position signal generation function configured to generate a motor position signal, $Y_1$, of the pan/tilt motor; a gyro signal generation function configured to generate a gyro signal, $Y_2$, pertaining to shaking of the video camera detected by the gyroscopic sensor; a reference signal generation function configured to generate a reference signal from a predetermined movement curve of the pan/tilt motor, the reference signal is a reference on how a pan/tilt operation of the video camera is made without shaking of the video camera; a signal combination function configured to generate a combined signal, Y, from the motor position signal, $Y_1$, and the gyro signal, $Y_2$, according to: $Y=F_1*Y_1+F_2*Y_2$, wherein $F_1$ is a low pass filter and $F_2$ is a high pass filter; and an image stabilization function configured to perform image stabilization on image frames of the video stream based on a difference between the combined signal, Y, and the reference signal.

The above-mentioned features of the method, when applicable, apply to the second aspect and third aspects as well. In order to avoid undue repetition, reference is made to the above.

A further scope of applicability of the present concepts will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that is the concepts are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present concepts will now be described more fully hereinafter with reference to the accompanying drawings, in which currently preferred embodiments are shown. This concepts may, however, be embodied in many different forms and should not be construed as limited to the embodiments set forth herein; rather, these embodiments are provided for thoroughness and completeness, and to fully convey the scope of the claims to the skilled person.

Figure 1:
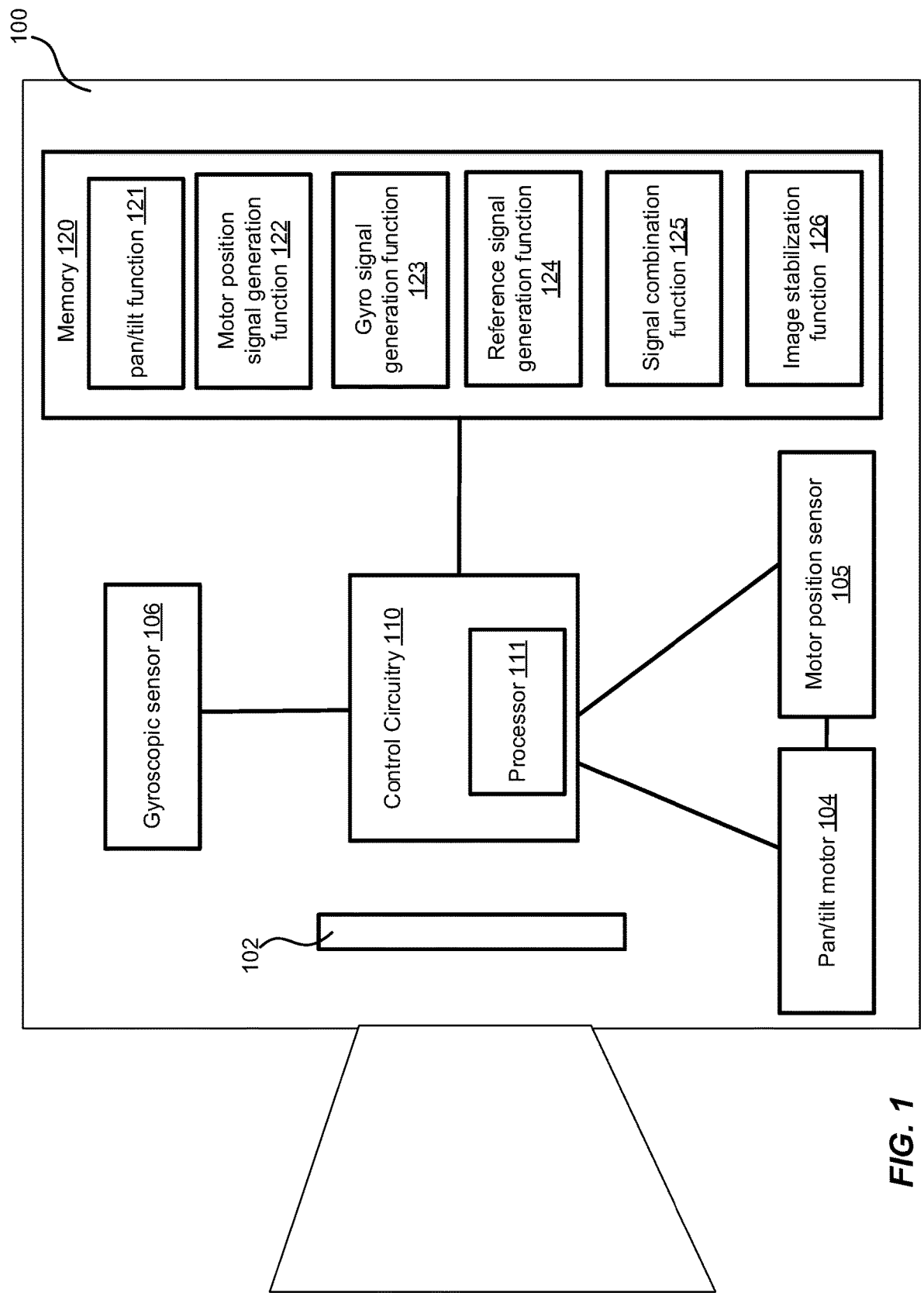
FIG. 1 illustrates a video camera.

FIG. 1 illustrates a video camera 100. The video camera 100 is typically a monitoring camera. The video camera 100 may be a digital video camera, especially a networked digital video camera. The video camera 100 is configured to monitor a scene. Typically, this is made by capturing a video stream of the scene. The video stream is captured using an image sensor 102.

The video camera 100 is a panable and/or tiltable video camera. Hence, during capturing the video stream of the scene, the video camera 100 may be panned and/or tilted. The panning and/or tilting of the video camera 100 is performed using a pan and/or tilt motor 104. The video camera 100 may have a dedicated pan motor and a dedicated tilt motor. The pan and/or tilt motor 104 may be a step motor. The pan and/or tilt motor 104 may be controlled by a pan/tilt control signal. To perform panning and/or tilting, the pan/tilt control signal is sent to the pan and/or tilt motor 104. The pan/tilt control signal instructs the pan and/or tilt motor 104 to move in accordance with a predetermined movement curve of the pan/tilt motor. The predetermined movement curve may be a pre-known acceleration curve. Hence, for a given pan/tilt movement a target speed is set, and the pan/tilt motor 104 is set to accelerate to this speed according to the pre-known acceleration curve. The pan/tilt motor 104 will accelerate, as close as possible, according to the acceleration curve and target speed. However, the actual speed may differ slightly from the predetermined movement curve. One example would be that the pan/tilt motor 104 receives a go to target position command. The pan/tilt motor 104 is the configured to first accelerate to a set speed, then keep the set speed, and then decelerate to come to a stop smoothly. However, sometimes an undesired deviation from the pre-known acceleration curve an occur, especially upon the stop of the pan/tilt motor 104. As the pan/tilt motor 104 come to a stop the video camera 100 may start to shake around the target position before coming to a full stop. This due to "springiness" of the pan/tilt motor 104 and or the mechanical drive system of the pan/tilt motor 104. Such shaking around the target position may be corrected using image stabilization according to the teachings herein.

The video camera 100 may comprise one or more motor position sensors 105. The one or more motor position sensors 105 may be implemented as one or more encoders. A motor position may be measured by the one or more motor position sensors 105. This may especially be made during panning and/or tilting of the video camera 100.

The video camera 100 further comprises one or more gyroscopic sensors 106. The one or more gyroscopic sensors 106 are configured to detect shaking of the video camera 100. The one or more gyroscopic sensors 106 may be configured to continuously detect shaking of the video camera 100.

The video camera further comprises control circuity 110. The control circuit 110 is configured to carry out overall control of functions and operations of the video camera 100. The control circuit 110 may include a processor 111, such as a central processing unit (CPU), microcontroller, or microprocessor. The processor 111 is configured to execute program code stored in a memory 120, in order to carry out functions and operations of the video camera 100.

The memory 120 may be one or more of a buffer, a flash memory, a hard drive, a removable medium, a volatile memory, a non-volatile memory, a random access memory (RAM), or another suitable device. In a typical arrangement, the memory 120 may include a non-volatile memory for long term data storage and a volatile memory that functions as system memory for the control circuit 110. The memory 120 may exchange data with the control circuit 110 over a data bus. Accompanying control lines and an address bus between the memory 120 and the control circuit 110 also may be present.

Functions and operations of the video camera 100 may be embodied in the form of executable logic routines (e.g., lines of code, software programs, etc.) that are stored on a non-transitory computer readable medium (e.g., the memory 120) of the video camera 100 and are executed by the control circuit 110 (e.g., using the processor 111). Furthermore, the functions and operations of the video camera 100 may be a stand-alone software application or form a part of a software application that carries out additional tasks related to the video camera 100. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The control circuit 110 may be configured to execute a pan/tilt function 121. The pan/tilt function 121 is configured to generate the pan/tilt control signal used to control panning and/or tilting of the video camera 110.

The control circuit 110 is configured to execute a motor position signal generation function 122. The motor position signal generation function 122 is configured to generate a motor position signal, Y1. The motor position signal, Y1, is a signal pertaining to a position of the pan/tilt motor 104. By the motor position signal, Y1, a reference point for the video camera 100 at different times, i.e., which pan/tilt position the video camera is in for a certain time, may be logged. The motor position signal may be measured during panning and/or tilting of the video camera 100. The motor position signal generation function 122 may be configured to generate the motor position signal from the motor positions measured by the one or more motor position sensors 105. The position signal may be related to a rotation of the pan/tilt motor 104 or rotation of a gear of the pan/tilt motor 104, especially in case the pan/tilt motor 104 is a step motor. Alternatively, or in combination, the motor position signal generation function 122 may be configured to generate the motor position signal from the pan/tilt control signal generated by the pan/tilt function 121. The motor position signal is a signal indicating a time dependent pan/tilt position of the video camera 100.

The control circuit 110 is configured to execute a gyro signal generation function 123. The gyro signal generation function 123 is configured to generate a gyro signal, Y2. The gyro signal, Y2 pertains to shaking of the video camera detected by the one or more gyroscopic sensors 106.

The one or more gyroscopic sensors 106 does not have a fixed reference point. They measure inertial forces, motion relative to "standing still". Alone they cannot answer a question such as "where are we now". On the other hand, the one or more motor position sensors 105 are aware of their position relative to a rigid body, e.g., an encoder ring. Hence, the one or more motor position sensors 105 have a fixed reference point. The motor position signal, unlike gyro signal, cannot detect when the whole video camera 100 is vibrating. The motor position signal is a measure of the motion of the video camera 100 relative to a fixed reference point.

The control circuit 110 is configured to execute a reference signal generation function 124. The reference signal generation function 124 is configured to generate a reference signal from the predetermined movement curve of the pan/tilt motor 104. The reference signal is a reference on how a pan/tilt operation of the video camera 100 is made without shaking of the video camera 100.

The control circuit 110 is configured to execute a signal combination function 125. The signal combination function 125 is configured to generate a combined signal, Y, from the motor position signal, Y1, and the gyro signal, Y2. The combined signal, Y, is generated according to the following: $Y=F1*Y1+F2*Y2$, wherein F1 is a low pass filter and F2 is a high pass filter. For example, a single-pole infinite impulse response, IIR, filter may be used. Such a filter may be used to implement both low-pass and high-pass filtering. By forming the combined signal an improved image stabilization may be made. The motor position signal is typically disturbed by high-frequency noise. The high-frequency noise may be introduced in the motor position signal due to quantization errors. The gyro signal is typically disturbed by low-frequency noise. Because the gyro signal (a measure of angular velocity) has to be integrated to get a position, and because the gyro signal will always contain some noise, the noise is added up and becomes significant over time. The gyro signal typical also comprises a DC offset. Hence, when there is no motion, the gyro signal will contribute with a small DC signal due to the DC offset. The DC offset is not constant, it will change slowly over time depending on e.g., temperature. This will also contribute to a low frequency noise. Hence, the low-frequency noise may be introduced in the gyro signal due to errors from imperfections in the sensor as well as temperature changes, which are integrated over time. By applying a low pass filter on the motor position signal and applying a high pass filter on the gyro signal and combining the two signal the respective noise may be at least partly filtered away a more correct signal indicative of the shaking of the video camera during panning and/or tilting of the same may be generated.

The control circuit 110 is configured to execute an image stabilization function 126. The image stabilization function 126 is configured to perform image stabilization on image frames of the video stream. The image stabilization is based on a difference between the combined signal, Y, and the reference signal, e.g., reference signal minus the combined signal. The image stabilization is preferably an Electronic Image Stabilization, EIS. EIS is commonly known to the skilled person and will not be discussed in detail in this disclosure.

Figure 2:
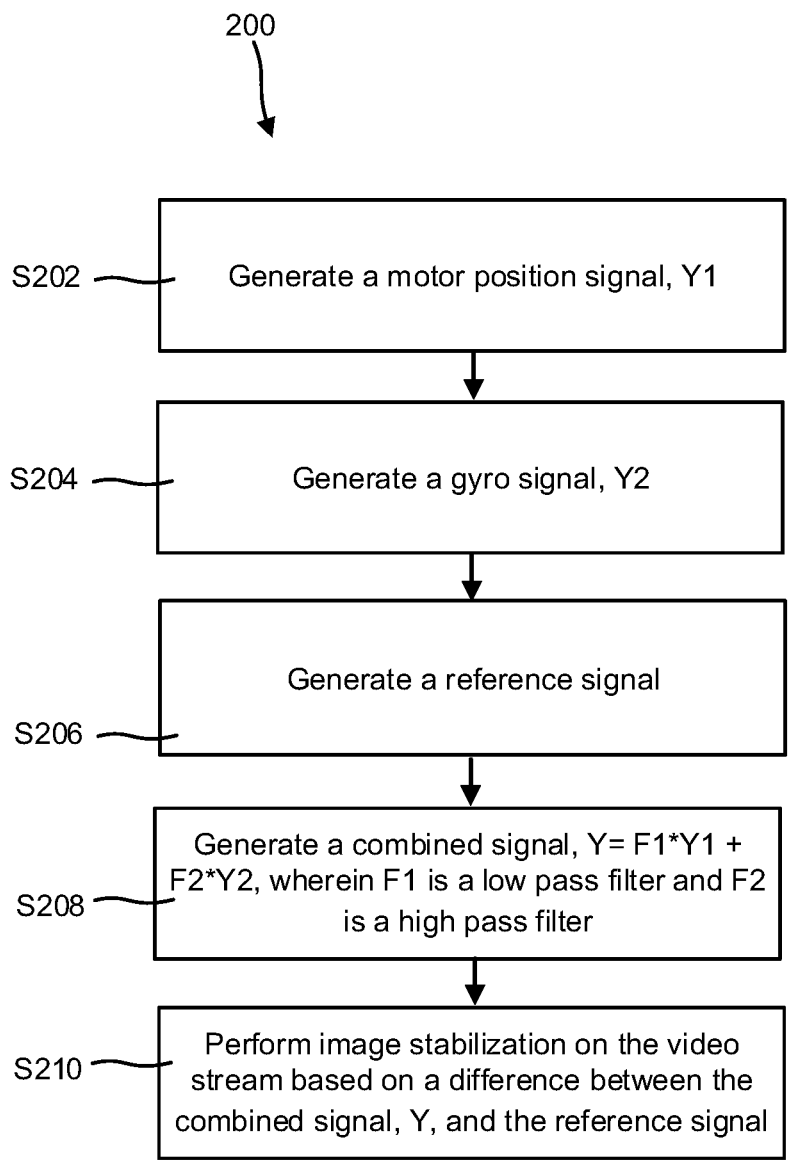
FIG. 2 is a block scheme of a method for image stabilization of a video stream captured by a panable and/or tiltable video camera.

In connection with FIG. 2 a method 200 for image stabilization of a video stream captured by a panable and/or tiltable video camera 100 will be discussed. The method 200 is based on the insight made by the inventors that by generating a combined signal from a low pass filter filtered motor position signal and a high pass filter filtered gyro signal and generating a reference signal from a predetermined movement curve of the pan/tilt motor 104 used to pan and/or tilt the video camera 100 improved image stabilization of image frames captured by the video camera 100 may be achieved.

Some of all the steps of the method 200 may be performed by the functions of the video camera 100 described above. However, it is equally realized that some or all of the steps of the method 200 may be performed by similar functions performed at other devices. The method 200 comprises the following steps. The steps may be performed in any suitable order.

Generating S202 a motor position signal, Y1, of a pan/tilt motor 104 of the video camera 100. The motor position signal, Y1, is a signal pertaining to a position of the pan/tilt motor 104. By the motor position signal, Y1, a reference point for the video camera 100 at different times, i.e., which pan/tilt position the video camera is in for a certain time, may be logged. The motor position signal is signal, which may be measured during panning and/or tilting of the video camera 100. The motor position signal may be generated from motor positions measured by the one or more motor position sensors 105. Alternatively, or in combination, the motor position signal may be generated from the pan/tilt control signal. The motor position signal is a signal indicating a time dependent pan/tilt position of the video camera 100.

Generating S204 a gyro signal, Y2, of a gyroscopic sensor 106 of the video camera 100. The gyro signal, Y2 pertains to shaking of the video camera detected by the one or more gyroscopic sensors 106.

Generating S206 a reference signal from the predetermined movement curve of the pan/tilt motor 104 of the video camera 100. The reference signal is a reference on how a pan/tilt operation of the video camera 100 is made without shaking of the video camera 100.

From the motor position signal, Y1, and the gyro signal, Y2, generating S208 a combined signal, Y. The combined signal is generated according to: $Y=F1*Y1+F2*Y2$, wherein F1 is a low pass filter and F2 is a high pass filter.

Performing S210 image stabilization on the video stream based on a difference between the combined signal, Y, and the reference signal. The image stabilization is preferably an Electronic Image Stabilization, EIS. EIS is commonly known to the skilled person and will not be discussed in detail in this disclosure.

The person skilled in the art realizes that the present concepts are by no means limited to the preferred embodiments described above. On the contrary, many modifications and variations are possible within the scope of the appended claims.

For example, the high pass filter may complementary to the low pass filer. Hence F2 may be equal to 1−F1.

Additionally, variations to the disclosed embodiments can be understood and effected by the skilled person in practicing the claims, from a study of the drawings, the disclosure, and the appended claims.

The invention claimed is:

1. A method for image stabilization of a video stream, comprising: capturing the video stream by a panable and/or tiltable video camera during pan/tilt of the video camera;

generating a motor position signal, Y1, of a pan/tilt motor of the video camera;
generating a gyro signal, Y2, of a gyroscopic sensor of the video camera, the gyro signal, Y2, being an integration of a measure from the gyroscopic sensor;
generating a reference signal from a predetermined movement curve of the pan/tilt motor of the video camera, the reference signal is a reference on how a pan/tilt operation of the video camera is made without shaking of the video camera;
from the motor position signal, Y1, and the gyro signal, Y2, generating a combined signal, Y, according to: Y=F1*Y1+F2*Y2, wherein F1 is a low pass filter and F2 is a high pass filter; and
performing electronic image stabilization on the video stream captured by the panable and/or tiltable video camera during pan/tilt of the video camera, based on a difference between the combined signal, Y, and the reference signal.

2. The method according to claim 1, wherein the high pass filter is complementary to the low pass filer such that, F2=1−F1.

3. A non-transitory computer-readable storage medium having stored thereon instructions for implementing a method for image stabilization of a video stream when executed on a video camera having processing capabilities, the method comprising:
capturing the video stream by a panable and/or tiltable video camera during pan/tilt of the video camera;
generating a motor position signal, Y1, of a pan/tilt motor of the video camera;
generating a gyro signal, Y2, of a gyroscopic sensor of the video camera, the gyro signal, Y2, being an integration of a measure from the gyroscopic sensor;
generating a reference signal from a predetermined movement curve of the pan/tilt motor of the video camera, the reference signal is a reference on how a pan/tilt operation of the video camera is made without shaking of the video camera;
from the motor position signal, Y1, and the gyro signal, Y2, generating a combined signal, Y, according to: Y=F1*Y1+F2*Y2, wherein F1 is a low pass filter and F2 is a high pass filter; and
performing electronic image stabilization on the video stream captured by the panable and/or tiltable video camera during pan/tilt of the video camera, based on a difference between the combined signal, Y, and the reference signal.

4. A video camera comprising:
an image sensor configured to capture image frames of a video stream;
a pan/tilt motor configured to pan and/or tilt the video camera;
a gyroscopic sensor configured to detect shaking of the video camera; and
control circuitry configured to execute:
a motor position signal generation function configured to generate a motor position signal, Y1, of the pan/tilt motor,
a gyro signal generation function configured to generate a gyro signal, Y2, pertaining to shaking of the video camera detected by the gyroscopic sensor, the gyro signal, Y2, being an integration of a measure from the gyroscopic sensor,
a reference signal generation function configured to generate a reference signal from a predetermined movement curve of the pan/tilt motor, the reference signal is a reference on how a pan/tilt operation of the video camera is made without shaking of the video camera,
a signal combination function configured to generate a combined signal, Y, from the motor position signal, Y1, and the gyro signal, Y2, according to: Y=F1*Y1+F2*Y2, wherein F1 is a low pass filter and F2 is a high pass filter, and
an image stabilization function configured to perform image stabilization on image frames of a video stream captured by the video camera during pan/tilt of the video camera, based on a difference between the combined signal, Y, and the reference signal.

5. The video camera according to claim 4, wherein the high pass filter is complementary to the low pass filer such that, F2=1−F1.

6. The method according to claim 1, wherein the motor position signal is a signal indicating a time dependent pan/tilt position of the video camera.

7. The non-transitory computer-readable storage medium according to claim 3, wherein the motor position signal is a signal indicating a time dependent pan/tilt position of the video camera.

8. The video camera according to claim 4, wherein the motor position signal is a signal indicating a time dependent pan/tilt position of the video camera.

\* \* \* \* \*